(12) United States Patent
Biagini

(10) Patent No.: US 9,637,011 B2
(45) Date of Patent: May 2, 2017

(54) CHARGER INCLUDING A DC-DC CONVERTER

(71) Applicant: INTELLIGENT ELECTRONIC SYSTEMS, Saint-Aunes (FR)

(72) Inventor: Eric Biagini, Perols (FR)

(73) Assignee: INTELLIGENT ELECTRONIC SYSTEMS, Montpellier (FR)

( * ) Notice: Subject to any disclaimer, the term of this patent is extended or adjusted under 35 U.S.C. 154(b) by 49 days.

(21) Appl. No.: 14/382,528

(22) PCT Filed: Mar. 7, 2013

(86) PCT No.: PCT/EP2013/054631
§ 371 (c)(1),
(2) Date: Sep. 2, 2014

(87) PCT Pub. No.: WO2013/132018
PCT Pub. Date: Sep. 12, 2013

(65) Prior Publication Data
US 2015/0134165 A1    May 14, 2015

(30) Foreign Application Priority Data

Mar. 9, 2012    (FR) ..................................... 12 00727

(51) Int. Cl.
| | |
|---|---|
| *B60L 11/18* | (2006.01) |
| *H02M 3/00* | (2006.01) |
| *H02J 7/02* | (2016.01) |
| *B60L 1/14* | (2006.01) |
| *B60L 3/00* | (2006.01) |
| *H02M 3/155* | (2006.01) |

(52) U.S. Cl.
CPC ............. *B60L 11/1811* (2013.01); *B60L 1/14* (2013.01); *B60L 3/003* (2013.01); *B60L 3/0069* (2013.01);
(Continued)

(58) Field of Classification Search
CPC ...... B60L 1/14; B60L 3/0069; B60L 11/1816; B60L 11/1864; B60L 11/1868;
(Continued)

(56) References Cited

U.S. PATENT DOCUMENTS 5,583,421 A * 12/1996 Barbehenn ............ H02M 3/005
                                                    323/222
2002/0013516 A1    1/2002 Freyre et al.
(Continued)

*Primary Examiner* — Truc M Do
(74) *Attorney, Agent, or Firm* — Duane Morris LLP; J. Rodman Steele, Jr.; Gregory M. Lefkowitz

(57) ABSTRACT

The invention relates to a charger (2) for a motor driven apparatus (8), the motor driven apparatus (8) including a battery (5) and pieces of equipment (7a, 7b, 7c), said charger (2) including: a first conversion module (3) for converting an alternating input current into a direct current having a first voltage; a second conversion module (4) for converting a direct current having a first voltage into a direct current having a second voltage that is lower than the first voltage; a switching module (6) connected to the first conversion module (3), and to the second conversion module (4), suitable for being connected to the battery (5); the switching module (6) being suitable for: in a charging mode, supplying power to the second conversion module (4) and the battery (5) via the first conversion module (3); in a use mode, supplying power to the second conversion module (4) via the battery (5); the second conversion module (4) being suitable for supplying power to the pieces of equipment (7a, 7b, 7c), and the second conversion module (4) including an SEPIC converter. The invention also relates to the motor driven apparatus including said device and to an electrical power supply method that uses said device.

8 Claims, 3 Drawing Sheets

(52) U.S. Cl.
CPC ....... *B60L 11/1816* (2013.01); *B60L 11/1864* (2013.01); *B60L 11/1868* (2013.01); *H02J 7/022* (2013.01); *H02M 3/005* (2013.01); *B60L 2200/42* (2013.01); *B60L 2200/44* (2013.01); *B60L 2210/10* (2013.01); *B60L 2210/12* (2013.01); *B60L 2210/30* (2013.01); *H02M 2003/1557* (2013.01); *Y02T 10/7005* (2013.01); *Y02T 10/7061* (2013.01); *Y02T 10/7066* (2013.01); *Y02T 10/7072* (2013.01); *Y02T 10/7233* (2013.01); *Y02T 10/7241* (2013.01); *Y02T 90/127* (2013.01); *Y02T 90/14* (2013.01)

(58) Field of Classification Search
CPC .. B60L 11/1811; B60L 3/003; B60L 2210/10; B60L 2200/42; B60L 2200/44; B60L 2210/12; B60L 2210/30; H02M 3/005; H02M 2003/1557; H02J 7/022; Y02T 10/7005
See application file for complete search history.

(56) References Cited

U.S. PATENT DOCUMENTS

| | | | | |
|---|---|---|---|---|
| 2004/0112320 A1* | 6/2004 | Bolz | ...................... | F02N 11/04 123/179.28 |
| 2005/0094338 A1* | 5/2005 | Minteer | ................... | H02H 3/06 361/71 |
| 2007/0199747 A1* | 8/2007 | Aoyagi | ............... | B60L 11/1861 180/65.31 |
| 2007/0278860 A1* | 12/2007 | Krieger | ................... | H02J 9/061 307/64 |
| 2008/0011528 A1* | 1/2008 | Verbrugge | ............... | B60K 6/28 180/65.29 |
| 2008/0174278 A1* | 7/2008 | Masias | ...................... | H02J 1/10 320/138 |
| 2009/0021078 A1* | 1/2009 | Corhodzic | .............. | G06F 1/263 307/67 |
| 2010/0133900 A1* | 6/2010 | King | ................... | B60L 11/1816 307/9.1 |
| 2010/0145561 A1* | 6/2010 | Song | ........................ | B60K 6/48 701/22 |
| 2010/0188054 A1* | 7/2010 | Asakura | ............... | G01R 31/025 320/161 |
| 2011/0014501 A1* | 1/2011 | Scheucher | ............... | B60K 1/04 429/7 |
| 2011/0018519 A1* | 1/2011 | Chatroux | ............ | H02M 3/1584 323/299 |
| 2011/0020720 A1* | 1/2011 | Chatroux | ............ | H02M 3/1584 429/431 |
| 2012/0049830 A1* | 3/2012 | Watanabe | ............. | H02M 3/158 323/293 |
| 2012/0123625 A1* | 5/2012 | Ueo | ........................ | B60L 3/003 701/22 |

* cited by examiner

CHARGER INCLUDING A DC-DC CONVERTER

CROSS-REFERENCE TO RELATED APPLICATIONS

This application is a §371 national stage entry of International Application No. PCT/EP2013/054631, filed Mar. 7, 2013, which claims priority to French Patent Application No. 12/00727, filed Mar. 9, 2012, the entire contents of which are incorporated herein by reference.

FIELD OF THE INVENTION

The present invention relates to a charging device including a DC-DC converter connected to an AC-DC converter, this charging device being particularly suited for use as an on-board device in an electric motor vehicle.

TECHNICAL BACKGROUND

Numerous mobile machines use electrical energy and are equipped with batteries, for example electric vehicles, cherry pickers, pallet trucks, etc. These machines usually include on-board chargers, in other words, electric battery chargers fitted directly to the mobile machines.

The main function of these on-board chargers is to recharge batteries using electricity available from the electricity supply network.

For reasons of autonomy and efficiency, the traction battery or batteries (which are used to supply power to the traction system, in other words the power train, of the above-mentioned machines) have high voltages (for example 48 V, 60 V or even 400 V or more), whereas the on-board electronics require a lower voltage. The most common nominal voltage is 12 V: it is the voltage required by the items of equipment conventionally used in a motor vehicle environment.

It is therefore necessary to add a DC-DC voltage converter, which lowers the voltage of the traction battery to the value required by the on-board equipment.

It is advantageous to incorporate both this DC-DC converter and the traction battery charging means into the same charging device, to save space, weight, and connectors, achieve greater reliability and facilitate the incorporation of these items of equipment into the vehicle or other motorised machine.

Conventionally, it is known to use the following as a DC-DC converter in a charging device as described above: either a circuit comprising a transformer, which is a heavy and bulky item of equipment; or a step-down (buck) converter, which has no galvanic isolation and which is a safety hazard in the event of failure and short-circuiting of the commutator of the converter (this is because, in this situation, the high input voltage is then applied directly to the output, which can damage the items of equipment operating at low voltage).

There is therefore a need to improve the safety of a charging device for motorised appliance (and in particular for vehicles) including a DC-DC converter, without resorting to equipment that is heavy, bulky and/or expensive.

SUMMARY OF THE INVENTION

The invention relates firstly to a charging device for a motorised appliance, the motorised appliance including a battery and items of equipment, said charging device comprising:

a first conversion module adapted to convert an alternating input current into a direct current having a first voltage;

a second conversion module adapted to convert a direct current having a first voltage into a direct current having a second voltage that is lower than the first voltage;

a switching module connected to the first conversion module and to the second conversion module and adapted to be connected to the battery;

the switching module being adapted:
in a charge mode, to supply power to the second conversion module and the battery via the first conversion module;
in a use mode, to supply power to the second conversion module via the battery;

the second conversion module being adapted to supply power to the items of equipment; and the second conversion module comprising a SEPIC converter.

According to an embodiment, the first voltage is from 24 to 500 V, preferably from 45 to 80 V.

According to an embodiment, the second voltage is from 5 to 20 V, preferably from 10 to 15 V.

According to an embodiment, the alternating input current has a voltage of from 80 V to 300 V, preferably from 85 to 265 V and/or a power of from 0.5 kW to 10 kW, preferably from 1 kW to 6 kW.

According to an embodiment, the SEPIC converter has an input, an output and a capacitor providing capacitive isolation between the input and the output, the capacitor preferably having a capacitance of from 2 µF to 100 µF, and more preferably from 15 µF to 45 µF.

According to an embodiment, the charging device of the invention is incorporated into, or on-board, the motorised appliance.

According to an embodiment, the charging device of the invention comprises a housing inside which the first conversion module, the second conversion module and the switching module are arranged.

The object of the invention is also a motorised appliance including the charging device as described above, and also the battery and the items of equipment stated above.

According to an embodiment, the motorised appliance is a vehicle.

According to an embodiment, the motorised appliance is an electrically powered motor vehicle.

According to an embodiment, the items of equipment comprise one or more items of equipment selected from a secondary battery, sensors, indicator lights, an on-board computer, lighting means and a vehicle radio.

The object of the invention is also a method for supplying electrical power to items of equipment of a motorised appliance, comprising supplying a direct current having a first voltage, converting this current into a direct current having a second voltage that is lower than the first voltage, and supplying the items of equipment with this direct current having a second voltage, in which the conversion stage is performed by a SEPIC converter.

According to an embodiment, the first voltage is from 24 to 500 V, preferably from 45 to 80 V, and/or the second voltage is from 5 to 20 V, preferably from 10 to 15 V.

According to an embodiment, the method comprises supplying an alternating input current and converting said input current into the direct current with the first voltage.}

According to an embodiment, the direct current at the first voltage also supplies power to a battery of the motorised appliance.

According to an embodiment, the alternating input current has a voltage of from 80 V to 300 V, preferably from 85 to 265 V and/or a power of from 0.5 kW to 10 kW, preferably from 1 kW to 6 kW.

According to an (alternative) embodiment, the direct current at the first voltage is provided by a battery of the motorised appliance.

According to an embodiment, the motorised appliance is a vehicle, preferably an electrically powered motor vehicle.

According to an embodiment, the items of equipment comprise one or more items of equipment selected from a secondary battery, sensors, indicator lights, an on-board computer, lighting means and a vehicle radio.

The present invention makes it possible to overcome the disadvantages of the prior art. It provides, more specifically, a charging device for motorised appliance (and in particular for vehicles) that provides capacitive isolation of the DC-DC converter and therefore ensures the safety of the device even in the event of a short-circuit failure of a component, without resorting to items of equipment that are heavy, bulky and/or expensive, such as transformers.

This is achieved by using a SEPIC-type converter. The term SEPIC means "single-ended primary-inductor converter". SEPIC-type architecture is known for low-power applications (office computers, etc.) but the present inventors have recognised that this architecture can be put to good use as part of a high-power application (for example, up to 500 W) such as charging motorised appliances (of the electric vehicle type).

As part of the invention, the SEPIC converter offers good efficiency, a simple structure, reliable operation and compact dimensions.

DESCRIPTION OF EMBODIMENTS OF THE INVENTION

The invention will now be described in greater detail and in non-limiting fashion in the description that follows.

Figure 1:
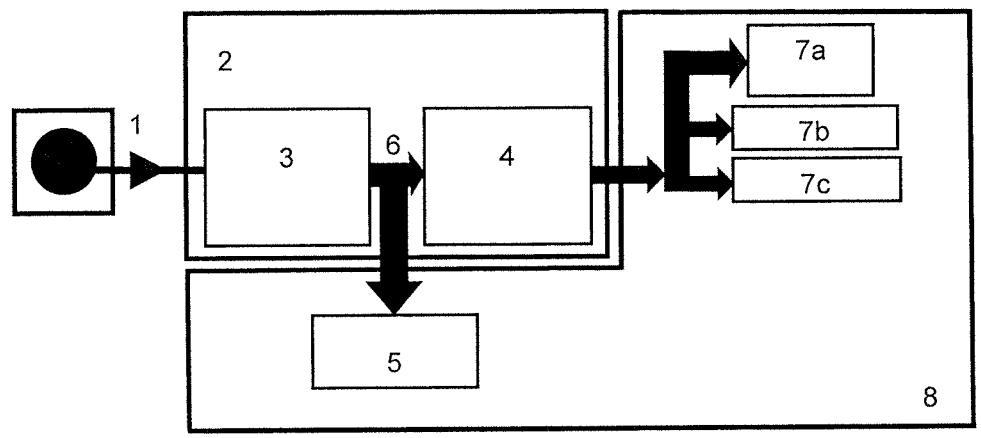
FIG. 1 is a diagram showing a charging device according to the invention, incorporated into a motorised appliance, operating in charge mode.
Figure 2:
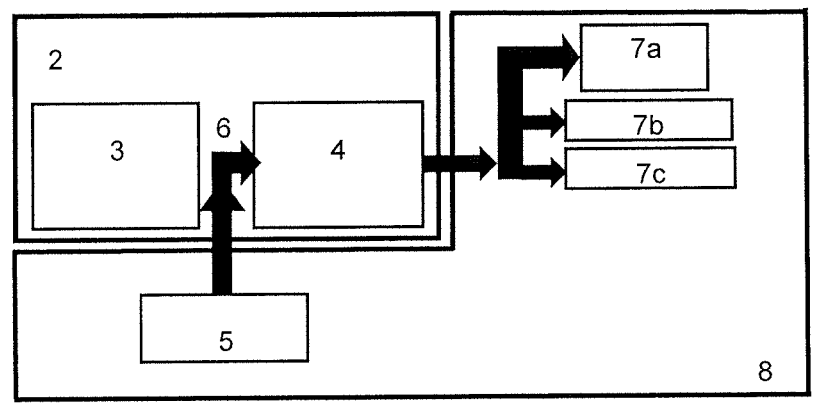
FIG. 2 is a diagram showing the same charging device, operating in use mode.

With reference to FIG. 1 and FIG. 2, a charging device 2 according to the invention is adapted to being fitted or incorporated into a motorised appliance 8 which includes a battery 5 and items of equipment 7a, 7b, 7c. The battery 5 is adapted to deliver, and to be charged by, a direct current with a first voltage, referenced U1. The items of equipment 7a, 7b, 7c are adapted to be charged and/or operate with a direct current that has a second voltage referenced U2, U2 being lower than U1.

According to a preferred embodiment, the motorised appliance 8 is a vehicle, in particular a motor vehicle, that is electrically powered. In other embodiments, the motorised appliance 8 can be a handling appliance such as a cherry picker, a power lift truck or a pallet truck.

The battery 5 is the traction battery of the vehicle (or of the machine), in other words, the battery responsible for supplying power to the motor of the vehicle (or of the machine). It is understood that this battery 5 may be a single battery or a group of batteries.

The items of equipment 7a, 7b, 7c can comprise sensors, indicator lights, an on-board computer, lighting means, a vehicle radio, etc.

They can also comprise a secondary battery, itself capable of supplying power to the remainder of the items of equipment 7a, 7b, 7c.

The voltage U1 is generally from 24 to 500 V, preferably from 45 to 80 V.

The voltage U2 is generally from 5 to 20 V, preferably from 10 to 15 V.

As an example, U1 can be approximately 60 V and U2 can be approximately 12 V.

The charging device 2 comprises a first conversion module 3, a second conversion module 4, and a switching module 6 which is connected to the first conversion module 3, to the second conversion module 4 and, where the charging device 2 is incorporated into the motorised appliance 8, to the battery 5.

The first conversion module 3 is adapted to convert an alternating power supply current into direct current at voltage U1.

The second conversion module 4 is adapted to convert a direct current at voltage U1 into a direct current at voltage U2 which is lower than U1.

Figure 4:
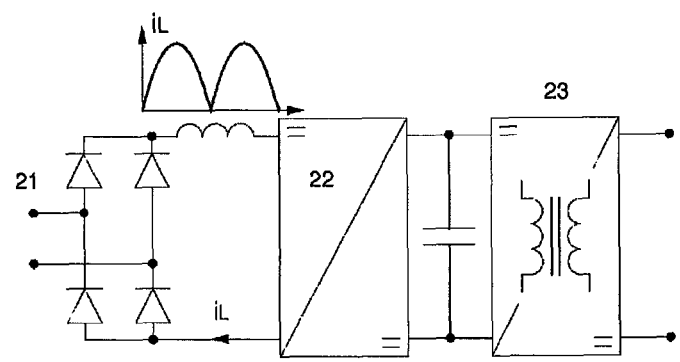
FIG. 4 is a schematic diagram of an AC-DC converter that can be used as part the invention.

With reference to FIG. 4, the first conversion module 3 usually has an input 21 intended to be connected to the electricity supply network and a pre-regulator with sinusoidal current absorption 22 (or PFC) followed by a DC-DC converter with galvanic isolation 23. The first conversion module 3 therefore transforms the electrical energy available from the supply network into DC voltage that is isolated from the mains. In the case of a battery charging application, it adapts this voltage to the conditions required to charge the battery.

The second conversion module 4 comprises a SEPIC converter that converts the direct current at voltage U1 into direct current at voltage U2.

The charging device 2 can operate in at least two separate modes, namely a charge mode and a use mode. For example, when the motorised appliance 8 is a motor vehicle, it is immobilised and connected to the electricity supply network in charge mode, whereas in use mode, the vehicle is disconnected from the electricity supply network, and can, for example, be driven.

With reference to FIG. 1, in charge mode, a power source 1 (such as the electricity supply network) supplies the first conversion module 3 with alternating current. This source of electrical power 1 can be a single-, two- or three-phase source or any other electrical source.

For example, for a single-phase voltage, the alternating voltage can be from 85 V to 265 V and the current can be approximately 16 A.

The switching module 6 ensures that the first conversion module 3 supplies direct current at voltage U1 to both the battery 5 (which is therefore charged) and the second conversion module 4.

With reference to FIG. 2, in use mode, the first conversion module 3 is not connected to any source of electrical power and is therefore not used. The charging device 2 and the motorised appliance 8 into which it is incorporated are supplied with direct current at voltage U1 by the battery 5.

More specifically, the switching module 6 ensures that the battery 5 supplies power to the second conversion module 4.

In charge mode and in use mode, the second conversion module 4 supplies direct current at voltage U2 to the items of equipment 7a, 7b, 7c of the motorised appliance.

The voltage U2 can be for example from 6 to 16 V with a nominal value of 12 V, the power being from 200 W to a few kilowatts. These values are dependent on the features of the items of equipment 7a, 7b, 7c and both the voltage values and the power values can increase.

Figure 3:
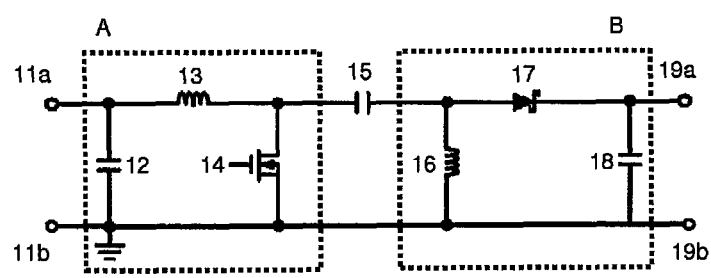
FIG. 3 is a schematic diagram of a SEPIC converter used as part of the invention.

With reference to FIG. 3, the SEPIC converter of the second conversion module 4 has input terminals 11a, 11b, namely a first input terminal 11a and a second input terminal 11b connected to the voltage reference. A first capacitor 12 is connected in parallel to the input terminals 11a, 11b. A series circuit with a first inductor 13 and a transistor 14 (one of the terminals of the transistor 14 being connected to the voltage reference) is connected to the terminals of the first capacitor 12.

A series circuit with a second capacitor 15 and a second inductor 16 (one of the terminals of the second inductor 16 being connected to the voltage reference) is connected to the terminals of the transistor 14.

A series circuit with a diode 17 and a third capacitor 18 (one of the terminals of the third capacitor 18 being connected to the voltage reference) is connected to the terminals of the second inductor 16.

Lastly, the terminals of the third capacitor 18 are connected to output terminals 19a, 19b, namely a first output terminal 19a and a second output terminal 19b connected to the voltage reference.

The direct current at voltage U1 is applied to the input terminals 11a, 11b while the direct current at voltage U2 is delivered to the output terminals 19a, 19b.

The parameters of the components are determined according to the use and dimensioning of the SEPIC converter.

As an illustration, the parameters of the components of the SEPIC converter can be as follows:
- first capacitor 12: capacitance from 0.1 µF to 10 µF, preferably from 0.4 µF to 10 µF;
- first inductor 13: inductance value from 0.5 µH to 100 µH, preferably from 5 µH to 35 µH;
- second capacitor 15: capacitance from 2 µF to 100 µF, preferably from 15 µF to 45 µF;
- second inductor 16: inductance value from 0.5 µH to 100 µH, preferably from 5 µH to 20 µH;
- third capacitor 18: capacitance from 20 µF to 10 mF, preferably from 1 mF to 5 mF;

The transistor 14 can be, for example, a MOSFET transistor or an insulated gate bipolar transistor (IGBT) or any other commutator.

The diode 17 is, for example a Schottky diode.

The SEPIC converter provides capacitive isolation between the input to the converter (the part of the circuit referenced A) and the output from the converter (the part of the circuit referenced B), by virtue of the second capacitor 15.

Thus, the safety of the device is ensured in the event of failure of the active components and in particular of the transistor 14.

Figure 5:
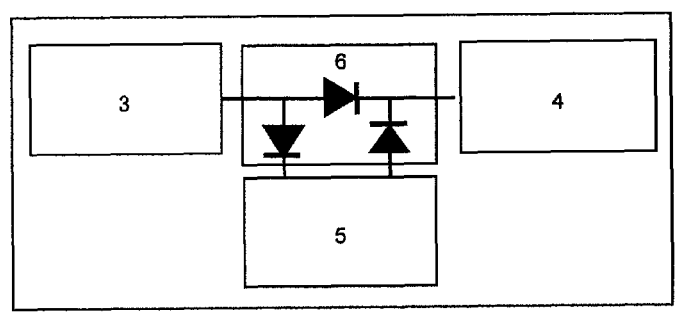
FIG. 5 is a diagram showing a commutator used as part the invention.

The function of the switching module 6 is to allow the switching of voltages between the different modes of operation. FIG. 5 shows an example of a switching module 6 that allows the second conversion module 4 to be supplied with power by either the first conversion module 3 or by the battery 5.

The invention claimed is:

1. Charging device (2) for a motorised appliance (8), the motorised appliance (8) including a battery (5) and items of equipment (7a, 7b, 7c), said charging device (2) comprising:
   - a first conversion module (3) adapted to convert an alternating input current into a direct current having a first voltage;
   - a second conversion module (4) adapted to convert adapted to a direct current having a first voltage into a direct current having a second voltage that is lower than the first voltage;
   - a switching module (6) connected to the first conversion module (3) and to the second conversion module (4) and adapted to be connected to the battery (5);
   the switching module (6) being adapted:
   in a charge mode, to supply power to the second conversion module (4) and the battery (5) via the first conversion module (3);
   in a use mode, to supply power to the second conversion module (4) via the battery (5);
   the second conversion module (4) being adapted to supply power to the items of equipment (7a, 7b, 7c); and
   the second conversion module (4) comprising a SEPIC converter.

2. Device according to claim 1, in which the first voltage is from 24 to 500 V, preferably from 45 to 80 V; and/or in which the second voltage is from 5 to 20 V, preferably from 10 to 15 V.

3. Device according to claim 1, in which the alternating input current has a voltage of from 80 V to 300 V, preferably from 85 to 265 V and/or a power of from 0.5 kW to 10 kW, preferably from 1 kW to 6 kW.

4. Device according to claim 1, in which the SEPIC converter has an input (11a, 11b), an output (19a, 19b) and a capacitor (15) providing capacitive isolation between the input (11a, 11b) and the output (19a, 19b), the capacitor (15) preferably having a capacitance of from 2 µF to 100 µF, and more preferably from 15 µF to 45 µF.

5. Device according to claim 1, which is incorporated into the motorised appliance (8); and/or comprising a housing inside which the first conversion module (3), the second conversion module (4) and the switching module (6) are arranged.

6. Motorised appliance (8) including the charging device (2) according to claim 1, and also the battery (5) and the items of equipment (7a, 7b, 7c) stated in claim 1.

7. Motorised appliance (8) according to claim 6, which is a vehicle, preferably an electrically powered motor vehicle.

8. Motorised appliance (8) according to claim 6, in which the items of equipment (7a, 7b, 7c) comprise one or more items of equipment selected from a secondary battery, sensors, indicator lights, an on-board computer, lighting means and a vehicle radio.

\* \* \* \* \*